May 12, 1959     H. ERNST ET AL     2,885,766
FACE MILLING CUTTER
Filed June 6, 1955     2 Sheets-Sheet 1
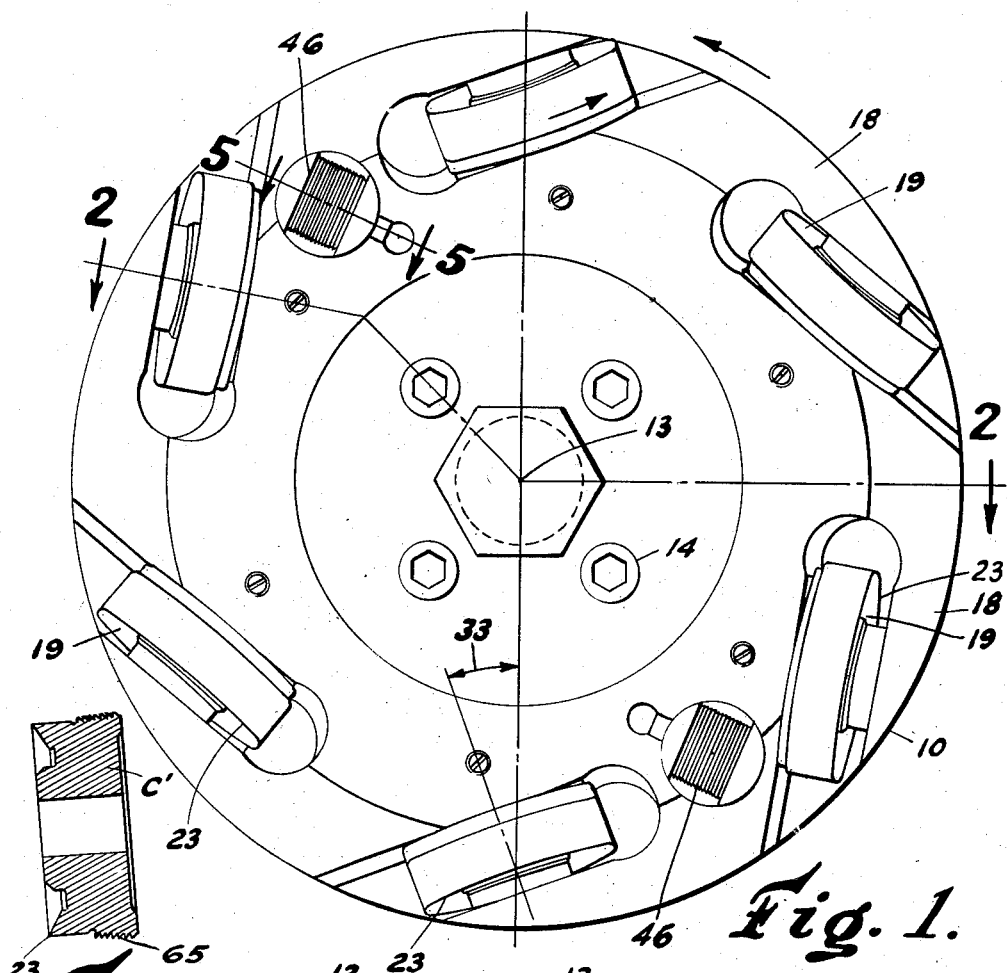
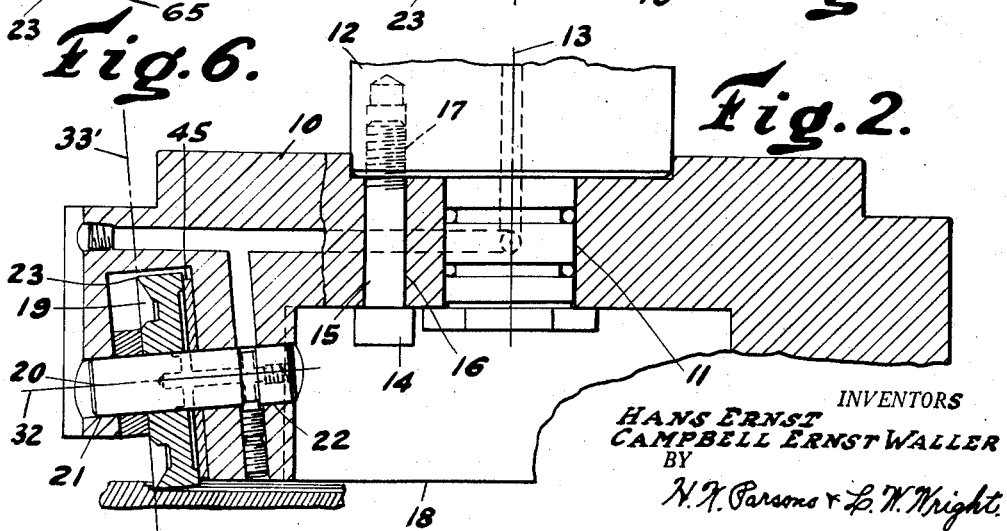
INVENTORS
HANS ERNST
CAMPBELL ERNST WALLER
BY
N. N. Parsons & L. W. Wright
ATTORNEYS May 12, 1959
H. ERNST ET AL
2,885,766
FACE MILLING CUTTER
Filed June 6, 1955
2 Sheets-Sheet 2
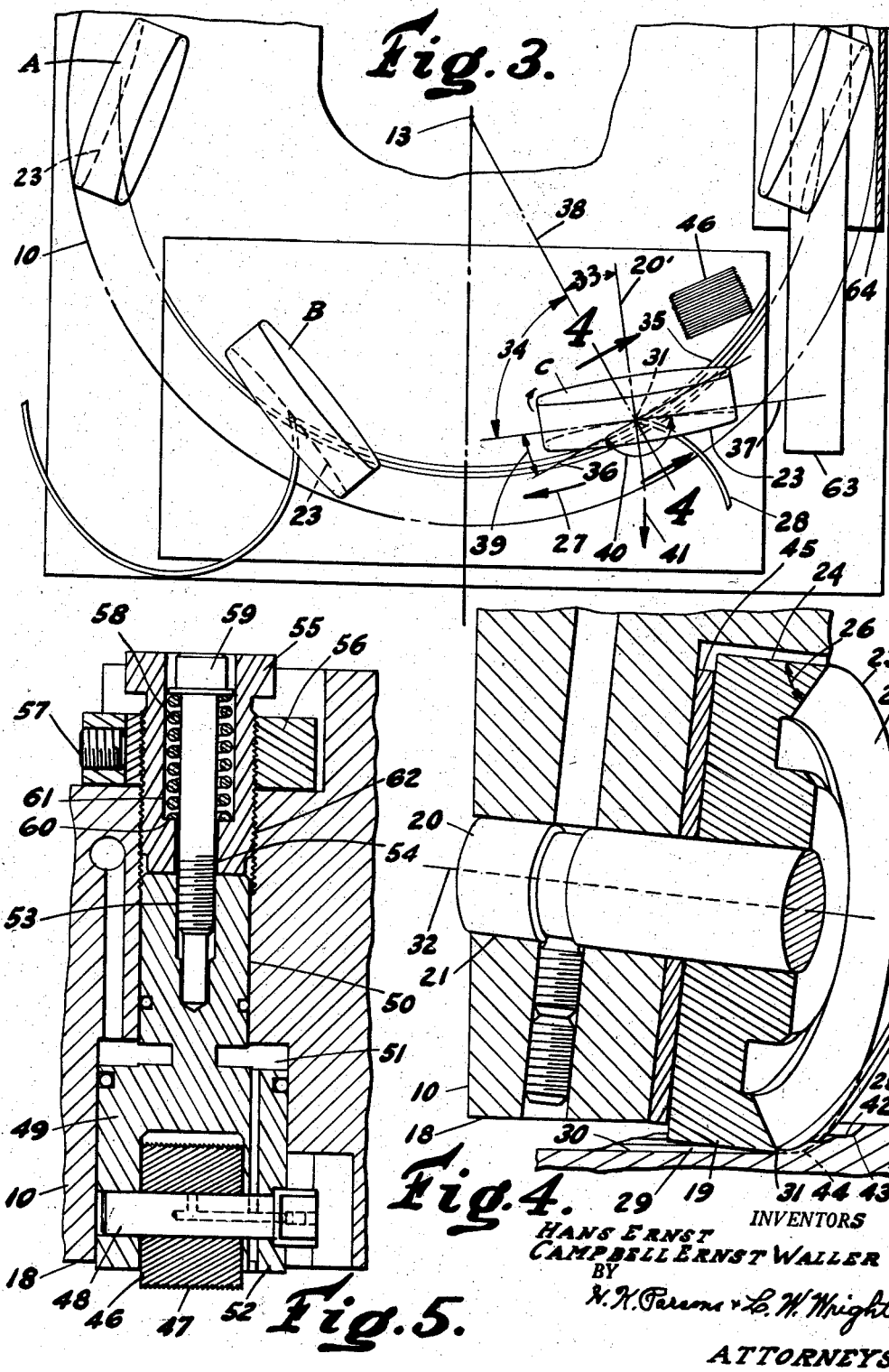
INVENTORS
HANS ERNST
CAMPBELL ERNST WALLER
BY
N. H. Parsons & L. W. Wright
ATTORNEYS

United States Patent Office 2,885,766
Patented May 12, 1959

2,885,766
FACE MILLING CUTTER

Hans Ernst and Campbell Ernst Waller, Cincinnati, Ohio, assignors to The Cincinnati Milling Machine Co., Cincinnati, Ohio, a corporation of Ohio Application June 6, 1955, Serial No. 513,214

1 Claim. (Cl. 29—105)

This invention relates to milling cutters and more particularly to face mills. One of the uses of a face mill is to hog off material from rough castings and the like to produce a flat machine surface. Such surfaces are usually covered with scale and the like which is always deleterious to the cutting edges of tools. Since the main purpose of hogging operations is to remove a large amount of material in a short time without too much regard to the finish obtained on the resultant surface produced, these operations are performed at the highest cutting rates possible within the limitations of the machine, cutting tools, and the strength of the work material.

One of the objects of this invention is to provide a new and improved face milling cutter for high speed milling operations which is so designed that in the actual cutting operation less work is done on the chip in its formation than with prior tools, and therefore less power is consumed per cubic inch of material removed per minute whereby a faster rotation of the tool may be obtained for a given horsepower of the machine.

Another object of this invention is to provide a face milling cutter having a new and improved design of cutter tooth which will remove the discrete chips with a minimum of distortion whereby less work is done on the chips, thus consuming a smaller amount of power in the chip formation process.

A further object of this invention is to provide a milling cutter having a series of circular cutting edges formed by the intersection of two surfaces, one of which is a surface of revolution, and one of which is a chip engaging surface, the chip engaging surface being so oriented and rotated with respect to the axis of the cutter as to produce freely formed chips upon engagement with the work material.

A further object of this invention is to provide a face mill with a plurality of cutting edges which are so oriented and positioned with respect to the direction of rotation that they do not engage the exterior crusted or scaly surface of the material to be removed, and thereby have longer cutter life and better maintain the size of the work being cut.

Still another object of this invention is to reduce cutter wear and thereby better maintain the size of the cutter for a longer time, as well as increasing the time between cutter sharpening operations by providing a cutter having a greater length of cutting edge only part of which is effective at a time.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claim, without departing from or exceeding the spirit of the invention.

Referring to the drawings in which like reference numerals indicate like or similar parts:

Figure 1 is a view of the cutting face of the cutter.

Figure 2 is a sectional view on the line 2—2 of Figure 1.

Figure 3 is a plan view showing the arrangement of the rotatable cutting elements showing the manner in which they engage the work.

Figure 4 is a section on the line 4—4 of Figure 3.

Figure 5 is a section on the line 5—5 of Figure 1, showing a finishing cutter element in elevation.

Figure 6 is a modified form of circular cutting element having a roughing cutting edge and finishing cutting edges.

The face milling cutter of this invention consists mainly of a rotatable cutter body in which is rotatably mounted a plurality of circular cutting elements, each having a circular cutting edge around its periphery, and each element is mounted for free rotation in the cutter body. The circular cutting edge is formed by the intersection of two surfaces, one a peripheral surface and the other an end surface, and the center of the circle lies in the axis of rotation of the element. These cutting elements are so supported in the main cutter body that each circular cutting edge has one point of tangency with the surface to be produced, and the cutter element is shown inclined in two directions about that point so that the point itself is the only part of the cutting element that theoretically is in conact with the surface to be produced. The end intersecting surface of the cutting element may be considered as the chip engaging face. As the main cutter body is rotated, the plane of the cutting edge is so inclined with respect to the direction of rotation of the cutter body that the work material is engaged by the chip engaging face at such an angle that the discrete chips are formed with a minimum of distortion and roll with said face toward the periphery of the cutter body, usually in long curled chips which eliminate chip clogging of the cutter.

In the drawings, and more particularly Figures 1 and 2, the reference numeral 10 indicates the main cutter body which is generally circular in shape and is provided with a central bore 11 by which it is centered and mounted on a suitable driving spindle 12 for rotation about the axis 13. The cutter may be secured to the spindle by any suitable means, such as by a plurality of headed bolts 14 having reduced shanks 15 passing through holes 16 of the cutter body and suitably threaded at 17 in the end of the driving spindle.

The lower face of the cutter or cutter body 10, as shown in Figure 2, is indicated generally by the reference numeral 18, and this is the face of the cutter that is shown in Figure 1. On this face is mounted a plurality of cutting elements, indicated by the reference numeral 19 whereby, upon rotation of the cutter, a face milling operation can be performed.

The cutting elements, as shown in Figure 4, are cylindrical members, and they are journaled for free rotation on supporting pins 20 which are mounted at opposite ends in aligned bores 21 and 22 formed in the cutter body as shown in Figure 2. Each cutting element is provided with a circular cutting edge 23, extending around its periphery, and this edge is formed by the intersection of two surfaces 24 and 25. The surface 24 is a peripheral surface of the cutter element 19, and the end surface 25 is the chip engaging face. The angle of intersection of these surfaces which is indicated by the reference numeral 26 in Figure 4 may be as great as 90 degrees, but it has been found that excellent results can be obtained if the angle is made around 60 degrees.

In Figure 3, the arrow 27 indicates the direction of rotation of the cutter body when looking at its cutting face. Thus, in Figure 4 the cutter body 19 is shown moving directly toward the viewer with the chip engaging face 25 of the cutter element 19 forming the chip 28.

It will now be seen that it is preferable in Figure 4 to provide a small clearance angle at 29 between the peripheral surface 24 of the cutter element and the work surface 30. This angle, if made about 5 degrees, will provide very good clearance for all practical purposes between the periphery of the cutter element and the work surface so that the only part of this surface that is theoretically in contact with the surface to be produced is the point 31 on the cutter edge 23 which theoretically is the point of tangency between the circle 23 and the surface 30.

The angles 26 and 29 can be obtained in various ways without materially affecting the efficiency of the cutter. In Figure 4, the clearance angle 29 is obtained by making the peripheral surface 24 in the form of a cylinder concentric with the axis 32 of the supporting pin 20, and then tilting the pin 20 with respect to the face 18 of the cutter body, which is normal to the axis 13, at an angle equal to the desired size of the angle 29. Since the clearance angle 29 is only a few degrees, it can be said that the axis 32 is substantially parallel or quasi-parallel to the face 18, and that the cutter element is arranged substantially perpendicular or quasi-perpendicular to the supporting face 18 of the cutter body. On the other hand, the supporting pin 20 could be mounted exactly parallel to the surface 18 whereby the plane of the cutting circle 23 would be perpendicular to the face 18, and then the clearance angle 29 could be obtained by making the peripheral surface 24 frusto-conical with the large end terminating in the cutting edge 23. Thus, the included angle 26 will vary in accordance with whether the peripheral surface 24 is frusto-conical or variations thereof up to cylindrical formation.

Outside of the extreme condition when the angle 26 is 90 degrees, it will be seen that in all other cases one or both of the surfaces 24 and 25 will be frusto-conical in formation.

It will be noted that, as the cutting element 19 moves toward the viewer in Figure 4, a force will be developed by the chip 28 cutting against the chip forming face 25 in a direction opposite the direction of rotation of the cutter body. Since the cutting element is mounted for free rotation on its supporting pin 20, a force couple is developed in which the rotating force of the body acts on the pin 20 in one direction, and the opposing force of the work material acts near the periphery of the cutting element in the opposite direction, thus producing rotation of the cutter element.

Since the chip 28 rolls with the chip forming face, there is very little relative movement between them. This reduces sliding friction which, in turn, reduces wear on the chip engaging face, and also reduces the heat developed. In addition, since the cutting edge and cutting face are constantly changing due to rotation of the element, the heat is better dissipated throughout the circumference of the element. The rotation of the element also aids in the application of coolant between the opposed surfaces of cutter face and chip. It will, therefore, be seen that with a given horsepower available a faster rotation of the cutter can be obtained than with a fixed blade cutter, which means more material can be removed in a given time.

In order that the cutting elements may be partially faced in the direction of rotation of the cutter to present the cutting edges to the work material, the supporting pin 20 is arranged to lie in a plane 20', Figure 3, parallel to the axis 13 which intersects a radial plane 38 of the cutter body in a line that passes through the point 31, which as previously described, is the point of tangency of the cutting edge circle 23 with the work surface 30 to be produced. The acute angle between the planes is represented by the reference numeral 33 in Figure 3. This means that the plane 33' containing the cutting edge 23 which is normal to the axis 32 as shown in Figure 2 and which also passes through the point 31, is at an angle with respect to a radial plane 38 of the cutter greater than 45 degrees and represented by the angle 34.

The reference numeral 35 indicates the circle of rotation or path of movement of the point 31, and the reference numeral 36 indicates a line tangent to the circlit 35 at the point 31. It will, therefore, be seen that the plane of the cutting edge circle, even although inclined outward passes through the point 31 and its line of intersection or trace 37 with the work surface, and lies between a radial plane 38 of the cutter and the tangent 36; and at an acute angle thereto indicated by the reference numeral 39. Since the angle 34 is greater than 45 degrees, the angle 39 is an acute angle and is actually equal to the angle 33. It will now be seen that the effective arc of the cutting circle beginning at the point 31 makes a large obtuse angle 40 with the tangent 36, and even although the direction of movement of the point 31 is in the direction of the tangent 36, the compressive stress on the chip material is at right angles to the effective arc, or in other words approximately along the line of the arrow 41. This causes the chip material to roll toward the outside of the cutter.

In the practical design and operation of this type of cutter, and to the end that each cutting element will remove its proportionate share of the work material, the cutting elements 19 are divided into two sets of three cutting elements apiece, although it will be realized that the number per set can be varied without departing from the principles of this invention. They are so designed that each element of a set cuts a little deeper than the preceding one. In other words, the first cutting element of the series would form the cut 42, Figure 4, the second one the cut 43 and the third one the cut 44. Also, the first cutting element would be a little further from the center of rotation of the cutter than the two following elements, but the second and third element would cut successively deeper than the first one.

All of these compensations are taken care of in the size of the cutting elements. In other words, if each cutting element was designed to cut a depth of chip, for example, 1/16", and referring to Figure 3, the cutting element A would be the smallest in diameter while the cutting element B would be made 1/8" larger in diameter than the element A and the cutting element C would be made 1/8" larger in diameter than the element B. Furthermore, they must be spaced at different distances from the axis of the cutter, so that without changing the construction of the cutter body itself, spacers, such as 45, indicated in Figure 4 are utilized, and these are made of different thickness, depending upon the width of each chip to be cut. This means that the cutter A would be the furthest from the center or axis of rotation of the cutter and therefore the spacer 45 would be the thickest. The spacers 45 would then be successively reduced for each succeeding cutting element of the set.

Since the cutting elements remove material at a fast rate the final surface is rather rough, and therefore, a pair of finishing cutters may be provided, one of which is shown in Figure 5. The reference numeral 46, in Figure 5, indicates the finishing cutting element, and it will be seen that it is merely in the form of a cylinder with annular teeth 47 formed around its periphery. This cutting element is supported on a pin 48 carried by an adjustable plunger 49 slidably mounted in a bore 50 formed in the cutter body and counterbored at 51 to receive the enlarged head 52 in which the cutting element is mounted. The member 49 is provided at one end with an axially threaded bore 53 in which is threaded an adjusting screw 54 which is mounted within a sleeve 55. The sleeve 55 has a lock nut 56 threaded on its periphery with a locking set screw 57. A spring 58 is interposed between the enlarged head 59 of the screw 54, and the bottom 60 of a bore 61 formed in one end of the sleeve 55. The sleeve 55 is also threaded at 62 in the bore 50. The sleeve 55 is thus adjusted by means of the screw threaded connection 62 to determine the position of the plunger 49, and then the plunger 49 is held in abutment against the lower end of the sleeve 55 by means of the adjusting screw 54 and the spring 59. The lock nut 56 is then tightened to hold the parts in their adjusted position.

Attention is invited to the fact that, since the rotatable cutter elements have a peripheral surface 24 (Fig. 4) of appreciable width and straight in one direction, friction means may be provided at one side of the cutter, such as the friction strip 63, to engage the periphery of the cutting elements just before they engage the work to impart rotation, that is, to spin the rotatable elements so that they are rotating at the time of engagement with the work material. The strip 63 may be supported by an angle bracket 64 that can be mounted to depend from the cutter spindle support in any suitable manner.

In Figure 6 of the drawings is shown a modified form of cutter element C', which may be substituted for the last element "C" in the series, and which has combined therein not only the roughing cutter edge 23 but finishing cutter edges 65. The tangent point of the edges 65 must, of course, be aligned in a straight line so as to be parallel to the surface of the work to be finished. They should also be slightly larger in diameter than the cutting edge 23 so as to be sure to engage the work surface enough to effect smoothing of the surface.

There has thus been provided a new and improved rotatable face milling cutter, which is equipped with rotatable cutting elements, rather than fixed cutting elements or fixed teeth, and these are tangentially presented to a work surface to effect a material removing operation in a new and improved manner by doing a minimum amount of work on the discrete chip particles in effecting their separation and formation of the chip, and in which the action causes the chip to roll with the chip engaging face of the cutter, thus producing a minimum amount of heat as evidenced by the fact that the chips are not of a deep blue color in spite of the high speed of chip removal.

What is claimed is:

A face milling cutter comprising a supporting member having an axis of rotation, a plurality of rotatable cutter elements circumferentially spaced on said member around said axis, a circular cutting edge formed on each cutter element, spacer means to change the radial distance of said elements from said axis of rotation, said elements being arranged in sets, the successive elements of each set in a direction counter to the direction of cutter rotation being progressively larger in diameter and radially spaced by said spacer means from the axis of cutter rotation successively lesser distances, the last cutter of each set having angular finishing cutter teeth formed thereon, and means supporting each cutter element on said member for free rotation and with the planes of said cutting edges arranged to present each cutting edge circle in tangential cutting relation to a work surface normal to said axis, each cutting edge plane also being positioned at a first angle with respect to a plane extending from the point of tangency of said circle through said axis and at a second angle with respect to a plane perpendicular to said first-named plane extending from said point of tangency in the direction of rotation imparted by the cutter, said first-named angle being greater than said second-named angle.

References Cited in the file of this patent

UNITED STATES PATENTS

| | | |
|---|---|---|
| 2,121,888 | Smith | June 28, 1938 |
| 2,233,724 | Bannister | Mar. 4, 1941 |
| 2,413,452 | Kaiser | Dec. 31, 1946 |
| 2,513,881 | Low | July 4, 1950 |
| 2,551,167 | Rolland | May 1, 1951 |
| 2,651,223 | Hahn | Sept. 8, 1953 |

FOREIGN PATENTS

| | | |
|---|---|---|
| 1,200 | Great Britain | Mar. 10, 1894 |
| 587,854 | Great Britain | May 7, 1947 |
| 607,770 | Great Britain | Sept. 8, 1948 |
| 676,050 | Great Britain | July 23, 1952 |
| 680,231 | Germany | Aug. 24, 1939 |